UNITED STATES PATENT OFFICE 2,562,151

HALOGENATED NITRO ETHERS

Murray Senkus, Terre Haute, Ind., assignor to Commercial Solvents Corporation, Terre Haute, Ind., a corporation of Maryland No Drawing. Application February 18, 1949, Serial No. 77,290

10 Claims. (Cl. 260—611)

My invention relates to new and useful halogenated nitro ethers and to a method of producing same. More particularly, it is concerned with the halogenated nitro ethers having the following structural formula:

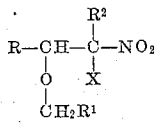

wherein X is a chlorine, bromine or iodine atom, R is a member selected from the group consisting of phenyl, halophenyl, monoalkylphenyl and alkylphenyl, $R^1$ is alkyl, aryl, chloromethyl, alkoxymethyl and tetrahydrofuryl and $R^2$ is a lower alkyl radical.

Halogenated nitro ethers of the above type are prepared by reacting a nitroolefin having the structural formula:

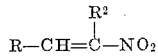

wherein R and $R^2$ have the values defined above, with an alcohol in the presence of a strong base, halogenating the resulting alkali salt of the nitro ether, and separating the desired halogenated nitro ether from the reaction mixture.

Typical nitroolefins coming within the scope of the above formula, which can be used in my process are: 2-nitro-1-phenyl-1-propene, 2-nitro-1-phenyl-1-butene, 2-nitro-1-(p-chlorophenyl)-1-butene, 2-nitro-1-(p-bromophenyl)-1-butene, 2-nitro-1-p-tolyl-1-butene and 2-nitro-1-phenyl-1-hexene.

The nitroolefins suitable for use in my new process may be produced by the condensation of aromatic aldehydes and nitroparaffins (Knoevenagel and Walter, Ber. vol. 37, p. 4502 (1904)); Worral, Jour. Am. Chem. Soc., vol. 56, p. 1556 (1934); Alles, Jour. Am. Chem. Soc., vol. 54, p. 271 (1932).

The alcohol employed in the production of these new compounds may be any lower primary alcohol such as methanol, ethanol, benzyl alcohol, tetrahydrofurfuryl alcohol, ethylene chlorhydrin and cellosolve. Any alkali or alkaline earth metal base may be used in my process, however, I prefer to use potassium or sodium hydroxide.

According to the process comprising my invention the strong base is dissolved in water and added to the alcohol. The nitroolefin is next added to the base-alcohol solution and dissolved. Varying steps may be necessary in order to cause the nitroolefin to dissolve, depending upon which nitroolefin is used. For example, some of the nitroolefins are solids and it may be necessary to heat the solution to or near the boiling point in order to dissolve them. In other cases the nitroolefin will easily go into solution if it is added in small batches with agitation.

While the proportions of the reactants used are not critical, it has been found desirable to add slightly more base than nitroolefin, on a mole basis.

The halogenation may be effected in accordance with known practices for the halogenation of sodium salts of nitroparaffins. The nitro ether in the form of its alkali salt is dissolved in an aqueous-alcohol solution and the halogen introduced therein in the form of a gas. However, the temperature and pressure may be so adjusted as to maintain both the nitro ether and the halogen in the liquid phase. I prefer to use elemental halogen in my process, although other halogenating agents, which are suitable for halogenation of aliphatic hydrocarbons, and are not adversely affected by nitro groups, may be employed, if desired.

The process may be carried out at any temperature within the range of about 0 to 125° C. However, I prefer to carry out the process at a temperature of about 20 to 30° C.

These new halogenated nitro ethers, with the halogen atom attached to a secondary carbon atom, possess many unexpected and unpredictable properties. For example, the new halogenated nitro ethers have been found to possess insecticidal activity and will find particular usefulness in that field. In addition, halogenated nitro ethers have wide uses as solvents, intermediates for the preparation of other products and for various other purposes.

Some properties of several of the new halogenated nitro ethers are shown in the table below:

Table I

| Ether | Boiling Point | | $n_D^{20}$ | $d_{20}^{20}$ | Melting Point |
|---|---|---|---|---|---|
| | °C. | Mm. | | | |
| 2-Nitro-2-bromo-1-methoxy-1-phenylpropane | | | | | 44.4–49.5 |
| 2-Nitro-2-chloro-1-methoxy-1-phenylpropane | 116 | 2 | | | 58.1–60.6 |
| 2-Nitro-2-chloro-1-ethoxy-1-phenylpropane | 108 | 0.2 | 1.1815 | 1.5113 | |
| 2-Nitro-2-bromo-1-methoxy-1-phenylbutane | 123 | 0.15 | | | 54 |
| 2-Nitro-2-chloro-1-methoxy-1-phenylbutane | 117 | 0.6 | 1.2001 | 1.5202 | |

The following specific examples will further illustrate my invention:

Example I

To a solution of 45 g. (1.1 mole) of 95% sodium hydroxide in 250 ml. of water and 400 ml. of methanol was added 142 g. (0.87 mole) of 2-nitro-1-phenyl-1-propene. After the nitroolefin had dissolved 160 g. (1 mole) of bromine was added to the mixture dropwise while it was stirred at 25–30°. Crystals separated from the mixture during the addition of bromine. The mixture was filtered and the solid was washed on the funnel with 500 ml. of water. After drying in the air for 24 hours the product, 2-nitro-2-bromo-1-methoxy-1-phenylpropane, weighed 241 g. The crude material melted over the range 44.4–49.5° C.

Anal. calcd. for $C_{10}H_{12}NO_3$: Br, 29.08. Found: Br, 29.07.

Example II

A solution of 50 g. (1.2 moles) or 95% sodium hydroxide dissolved in 350 ml. of water and 650 ml. of methanol was heated to its boiling point and 163 g. (1 mole) 2-nitro-1-phenyl-1-propene was added in 10 g. batches over a period of ½ hour. The clear solution was distilled at about 75 mm. to remove the methanol. To the residue, about 200 ml., was added 1200 ml. of water and chlorine was passed into the solution until the pH of the aqueous layer had dropped to 4.5. The lower non-aqueous layer was separated and distilled in vacuo. The product distilled at 116° at 2 mm. and weighed 203 g. It was analyzed and found to be 2-nitro-2-chloro-1-methoxy-1-phenylpropane.

The product solidified on standing. A 54 g. portion was crystallized from 140 ml. of methanol to give 26 g. of product which melted over the range 58.1–60.6° C. Anal. calcd. for $C_{10}H_{12}NO_3Cl$: Cl, 15.46. Found: Cl, 15.48.

Example III

A solution of 50 g. (1.12 moles) of 95% sodium hydroxide dissolved in 200 ml. of water and 1 liter of ethyl alcohol was placed in a 3-liter 3-necked flask fitted with a stirrer and surrounded by a running cold water bath. To this solution was added 165 g. (1 mole) of 2-nitro-1-phenyl-1-propene and the mixture was stirred until the solid had dissolved. To this solution was added 1400 ml. of water and then chlorine was added until the pH in the water layer had dropped to 1.6. The lower layer was separated, washed with 1 liter of 1% sodium bicarbonate solution and 1 liter of water, and distilled at reduced pressure. This distillation yielded 206 g. of 2-nitro-2-chloro-1-ethoxy-1-phenylpropane, B. P. 108° at 0.2 mm. Anal. calcd. for $C_{11}H_{14}NO_3Cl$: Cl, 14.99. Found: 14.86, $n_D^{20}$ 1.1815; $d_{20}^{20}$ 1.5113.

Example IV

To a solution of 50 g. (1.2 moles) of 95% sodium hydroxide dissolved in 250 ml. of water and 700 ml. of methanol was added dropwise with good agitation at 25° 190 g. (1.1 mole) of 2-nitro-1-phenyl-1-butene. After the nitroolefin had dissolved, 180 g. (1.1 moles) of bromine was added to the solution at 25° with good agitation. To the mixture was added 1500 ml. of water, and the non-aqueous layer was separated and distilled in vacuo. This distillation gave 211 g. of a product boiling at 123° at 0.15 mm. On standing at room temperature this product solidified. Recrystallization from 300 ml. of methanol gave 103 g. of 2-nitro-2-bromo-1-methoxy-1-phenylbutane melting at 54.4°. Anal. calcd. for $C_{11}H_{14}NO_3Br$: Br, 28.12. Found: Br, 28.05.

Example V

To a solution of 50 g. (1.2 moles) of 95% sodium hydroxide dissolved in 250 ml. water and 700 ml. of methanol was added dropwise with good agitation at 25° 190 g. (1.1 moles) of 2-nitro-1-phenyl-1-butene. After the nitroolefin had dissolved, chlorine was passed into the solution at 25° until the pH of the aqueous layer had dropped to 1.3. This mixture was then distilled through a 5-foot laboratory column to recover the methanol. The non-aqueous layer of the residue was then distilled at reduced pressure. This distillation yielded 200 g. of 2-nitro-2-chloro-1-methoxy-1-phenylbutane, B. P. 117° at 0.6 mm. Anal. calcd. for $C_{11}H_{14}NO_3Cl$: Cl, 14.99. Found: Cl, 15.37; $n_D^{20}$ 1.5202; $d_{20}^{20}$ 1.2001.

Example VI 26 grams of 2-nitro-1-p-chlorophenyl-1-propene was added portionwise to a solution of 200 ml. of methanol, 7 grams of sodium hydroxide and 20 ml. of water, at 65° C. To the solution was then added 500 ml. of water and the resulting solution was distilled to remove the methanol. Chlorine gas was added to the residue until the pH dropped to 6.5. Crystals then formed and were separated, filtered and dried. The resulting crystals of 2-nitro-2-chloro-1-methoxy-1-p-chlorophenyl-1-propane weighed 32 grams, indicating a conversion of 92.0%. The material had a melting point of 57.8° C. Anal. calcd. for $C_{10}H_{11}NO_3Cl_2$: Cl, 27.81. Found: Cl, 27.66.

It is to be understood, of course, that the above examples are merely illustrative, and no not limit the scope of my invention. In general, it may be said that the use of any equivalents or modifications of procedure which would naturally occur to those skilled in the art, is included in the scope of my invention.

My invention now having been described, what I claim is:

1. As new compositions of matter halogenated nitro ethers having the formula:

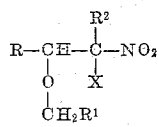

wherein X is selected from the group consisting of chlorine, bromine and iodine, R is a member selected from the group consisting of phenyl, halophenyl and monoalkylphenyl, and $R^1$ is selected from the group consisting of alkyl, aryl, chloromethyl, alkoxymethyl and tetrahydrofuryl and $R^2$ is a lower alkyl radical.

2. As a new composition of matter, 2-nitro-2-bromo-1-methoxy-1-phenylpropane.

3. As a new composition of matter, 2-nitro-2-chloro-1-ethoxy-1-phenylpropane.

4. As a new composition of matter, 2-nitro-2-chloro-1-methoxy-1-phenylbutane.

5. A process for preparing halogenated nitro ethers having the formula:

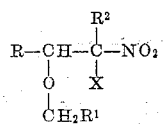

wherein X is selected from the group consisting of chlorine, bromine and iodine, R is a member selected from the group consisting of phenyl, halophenyl and monoalkylphenyl, and $R^1$ is selected from the group consisting of alkyl, aryl, chloromethyl, alkoxymethyl and tetrahydrofuryl and $R^2$ is a lower alkyl radical, which comprises dissolving an alcohol, selected from the group consisting of lower primary and secondary aliphatic alcohols, in an aqueous solution of an alkali-metal hydroxide, adding thereto a nitroolefin having the formula:

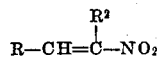

wherein R is a member selected from the group consisting of phenyl, halophenyl, and monoalkylphenyl, and $R^2$ is alkyl; adding a halogen to the resulting mixture, containing the alkali-salt of the nitro ether and separating the desired halogenated nitro ether therefrom.

6. The process of claim 5 wherein the temperature of the reactants is maintained between 0° and 125° C.

7. A process for preparing 2-nitro-2-bromo-1-methoxy-1-phenylpropane, which comprises dissolving methanol in an aqueous solution of an alkali-metal hydroxide, adding 2-nitro-1-phenyl-1-propene thereto, adding bromine to the resulting mixture, and separating the 2-nitro-2-bromo-1-methoxy-1-phenylpropane therefrom.

8. A process for preparing 2-nitro-2-chloro-1-ethoxy-1-phenylpropane, which comprises dissolving ethyl alcohol in an aqueous solution of an alkali-metal hydroxide, adding 2-nitro-1-phenyl-1-propene thereto, adding chlorine to the resulting mixture, and separating the 2-nitro-2-chloro-1-ethoxy-1-phenylpropane therefrom.

9. A process for producing 2-nitro-2-chloro-1-methoxy-1-phenylbutane, which comprises dissolving methanol in an aqueous solution of an alkali-metal hydroxide, adding 2-nitro-1-phenyl-1-butene thereto, adding chlorine to the resulting mixture, and separating the 2-nitro-chloro-1-methoxy-1-phenylbutane therefrom.

10. In a process for preparing halogenated nitro ethers having the formula:

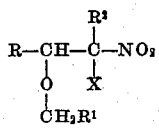

wherein X is selected from the group consisting of chlorine, bromine and iodine, R is a member selected from the group consisting of phenyl, halophenyl and monoalkylphenyl, and $R^1$ is selected from the group consisting of alkyl, aryl, chloromethyl, alkoxymethyl and tetrahydrofuryl and $R^2$ is a lower alkyl radical, by the halogenation of nitro ethers having the formula:

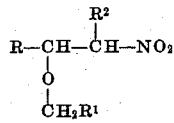

wherein $R^1$ and $R^2$ have the values defined above, the step which comprises carrying out said halogenation in the presence of an alkali metal hydroxide.

MURRAY SENKUS.

REFERENCES CITED

The following references are of record in the file of this patent:

UNITED STATES PATENTS

| Number | Name | Date |
|---|---|---|
| 2,335,384 | Bousquet et al. | Nov. 30, 1943 |
| 2,393,827 | Senkus | Jan. 29, 1946 |

OTHER REFERENCES

Alles, J. A. C. S., vol. 54, page 271 (1932).

Irwin et al., J. A. C. S., vol. 63, pages 858–859 (1940).